United States Patent
Igarashi et al.

(10) Patent No.: US 7,898,676 B2
(45) Date of Patent: Mar. 1, 2011

(54) IMAGE FORMING DEVICE, IMAGE FORMING METHOD, IMAGE FORMING PROGRAM, AND RECORDING MEDIUM

(75) Inventors: Masaaki Igarashi, Saitama (JP); Akira Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1121 days.

(21) Appl. No.: 11/633,017

(22) Filed: Dec. 4, 2006

(65) Prior Publication Data

US 2007/0127042 A1    Jun. 7, 2007

(30) Foreign Application Priority Data

Dec. 5, 2005    (JP) .............. 2005-350752

(51) Int. Cl.
 G06K 15/00    (2006.01)
 G06F 3/12     (2006.01)
 G03G 15/00    (2006.01)
(52) U.S. Cl. ............ 358/1.14; 358/1.15; 358/1.16; 358/1.17; 358/1.6; 399/16; 399/12; 399/82; 399/85
(58) Field of Classification Search ............ 358/1–1.18, 358/1.6; 399/389, 16, 12, 82, 85
See application file for complete search history.

(56) References Cited

U.S. PATENT DOCUMENTS

| | | | | |
|---|---|---|---|---|
| 5,534,974 A * | 7/1996 | Hasegawa | ............... | 399/1 |
| 6,285,844 B1 * | 9/2001 | Kuga | ............... | 399/85 |
| 6,876,825 B2 * | 4/2005 | Kurahashi et al. | ............... | 399/82 |
| 7,359,670 B2 * | 4/2008 | Amano et al. | ............... | 399/389 |
| 7,516,494 B2 * | 4/2009 | Hayano | ............... | 726/28 |
| 2006/0056859 A1 * | 3/2006 | Otani | ............... | 399/16 |
| 2007/0229880 A1 * | 10/2007 | Harmon et al. | ............... | 358/1.15 |
| 2008/0209531 A1 * | 8/2008 | Hayano | ............... | 726/6 |
| 2009/0175633 A1 * | 7/2009 | Shimizu | ............... | 399/12 |
| 2009/0180143 A1 * | 7/2009 | Kurahashi et al. | ............... | 358/1.15 |

FOREIGN PATENT DOCUMENTS

| | | |
|---|---|---|
| JP | 1-292418 | 11/1989 |
| JP | 6-176020 | 6/1994 |
| JP | 2002-281111 | 9/2002 |

\* cited by examiner

*Primary Examiner*—James A Thompson
*Assistant Examiner*—Satwant K Singh
(74) *Attorney, Agent, or Firm*—Dickstein Shapiro LLP

(57) ABSTRACT

An image forming device comprises a tray parameter table in which tray IDs for identifying one or trays of the image forming device and tray parameters for the respective tray IDs are stored in a mutually associated manner. A replacing unit receives an input tray ID and an input tray change parameter specified by an externally supplied printer control protocol, and replaces a tray parameter contained in the tray parameter table and corresponding to a tray ID which is the same as the input tray ID, by the input tray change parameter.

12 Claims, 12 Drawing Sheets

FIG.4A

| TRAY ID | TRAY PARAMETER |
| --- | --- |
|  | IMAGE FORMING DEVICE 13 |
| AUTO. SHEET SELECTION | 7 |
| Tray1 | 8 |
| Tray2 | 1 |
| Tray3 | 4 |
| Tray4 | 30 |
| Tray5 | 23 |
| Tray6 | 24 |
| Tray7 | 25 |
| Tray8 | – |
| Tray9 | – |
| MANUAL BYPASS | 2 |
| MASS SHEET FEEDING | 5 |

FIG.4B

| TRAY ID | TRAY PARAMETER | |
| --- | --- | --- |
|  | IMAGE FORMING DEVICE 13 | |
| AUTO. SHEET SELECTION | 7 | 0 |
| Tray1 | 8 | 3 | 13 |
| Tray2 | 1 | 6 | – |
| Tray3 | 4 | 9 | – |
| Tray4 | 30 | 10 | – |
| Tray5 | 23 | 11 | – |
| Tray6 | 24 | – | – |
| Tray7 | 25 | – | – |
| Tray8 | – | – | – |
| Tray9 | – | – | – |
| MANUAL BYPASS | 2 | 12 | – |
| MASS SHEET FEEDING | 5 | – | – |

FIG.5

| TRAY ID | TRAY PARAMETER | | |
|---|---|---|---|
| | IMAGE FORMING DEVICE 12 (STANDARD SPEC.) | IMAGE FORMING DEVICE 13 (CUSTOMIZED SPEC.) | IMAGE FORMING DEVICE 14 (CUSTOMIZED SPEC.) |
| AUTO. SHEET SELECTION | 7 | 7 | 7 |
| Tray1 | 4 | 8 | 1 |
| Tray2 | 1 | 1 | 4 |
| Tray3 | 5 | 4 | 5 |
| Tray4 | 20 | 30 | 20 |
| ... | ... | ... | ... |

FIG.6

| TRAY ID | TRAY PARAMETER | | |
| --- | --- | --- | --- |
| | IMAGE FORMING DEVICE 12 (STANDARD SPEC.) | IMAGE FORMING DEVICE 13 (CUSTOMIZED SPEC.) | IMAGE FORMING DEVICE 13 (AFTER CHANGE OF ASSIGNMENT) |
| AUTO. SHEET SELECTION | | | |
| Tray1 | 7 | 7 | 7 |
| Tray2 | 4 | 8 | 4 |
| Tray3 | 1 | 1 | 1 |
| Tray4 | 5 | 4 | 5 |
| ... | 20 | 30 | 20 |
| ... | ... | ... | ... |

FIG.7

| TRAY ID | TRAY PARAMETER | | |
| --- | --- | --- | --- |
| | IMAGE FORMING DEVICE 12 (STANDARD SPEC.) | IMAGE FORMING DEVICE 13 (CUSTOMIZED SPEC.) | IMAGE FORMING DEVICE 13 (AFTER CHANGE OF ASSIGNMENT) |
| AUTO. SHEET SELECTION | 7 | 7 | 7 |
| Tray1 | 4 | 8 | 4, 8 |
| Tray2 | 1 | 1 | 1 |
| Tray3 | 5 | 4 | 5 |
| Tray4 | 20 | 30 | 20, 30 |
| ... | ... | ... | ... |

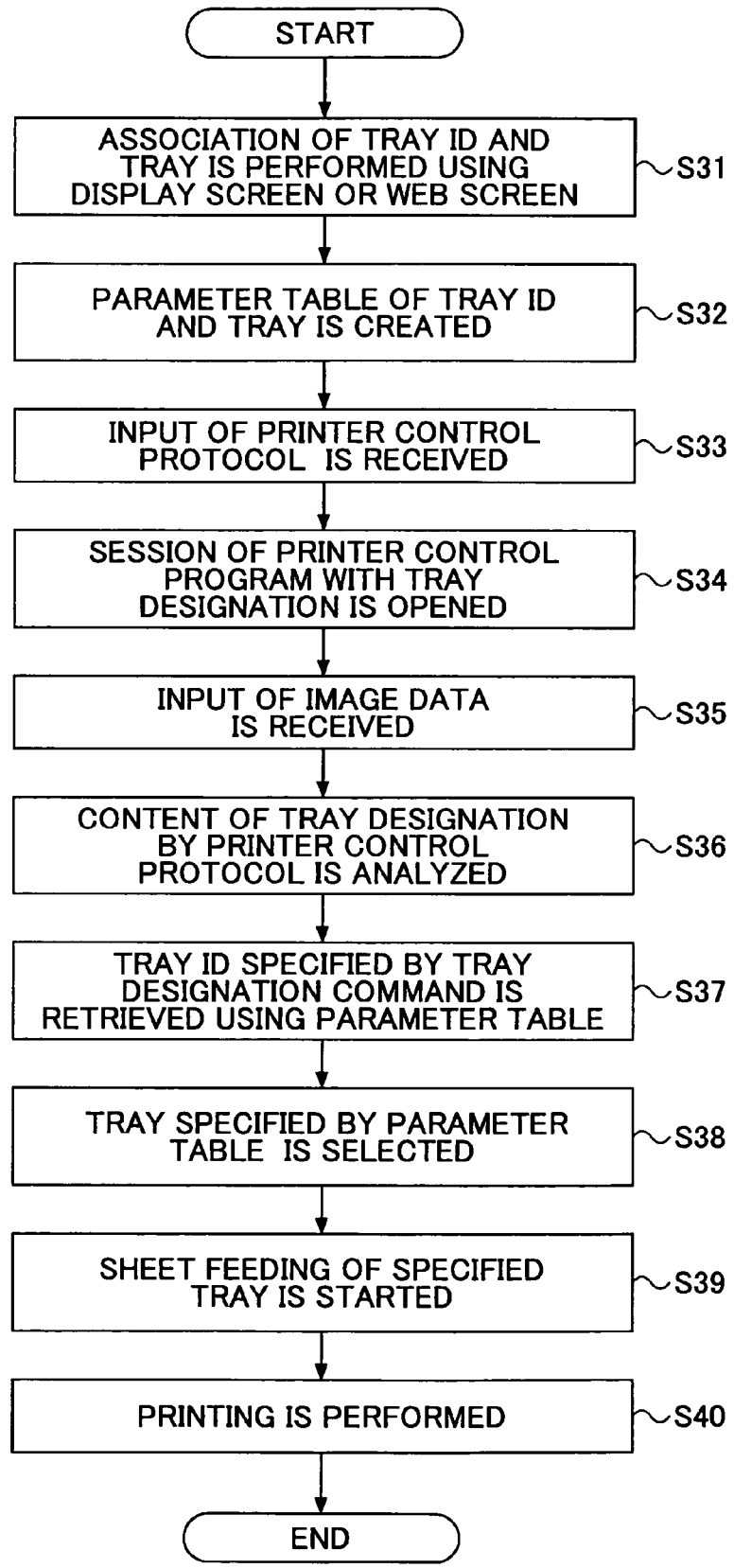

IMAGE FORMING DEVICE, IMAGE FORMING METHOD, IMAGE FORMING PROGRAM, AND RECORDING MEDIUM

BACKGROUND OF THE INVENTION

1. Field of the Invention

The present invention relates to an image forming device, an image forming method, an image forming program, and a computer-readable recording medium which are adapted to attain highly precise image formation.

2. Description of the Related Art

Conventionally, there is known an image forming device which performs image formation processing according to the printer control protocol command inputted. For example, refer to Japanese Laid-Open Patent Application No. 06-176020, Japanese Laid-Open Patent Application No. 01-292418, and Japanese Laid-Open Patent Application No. 2002-281111.

Japanese Laid-Open Patent Application No. 06-176020 discloses the means for converting a command parameter into a command character string, in order to facilitate understanding of the printer control command.

Japanese Laid-Open Patent Application No. 01-292418 discloses that, in the command system of a computer system, the means for interpreting the positional type parameter of a command with the relative location in a positional type parameter group.

Japanese Laid-Open Patent Application No. 2002-281111 discloses that a protocol specification definition file is externally supplied and incorporated in the inside of an image forming device, and even if the extension of the protocol etc. occurs, it is possible to carry out the protocol analysis easily.

In the conventional technology, the user specifies the tray designation, paper size, paper type, etc. for the time of printing execution, in accordance with the rules indicated in the predetermined character string specifications of the printer control protocol.

However, there are differences in the character string specifications between the design changes of the protocol, between the models, and between the manufacturers, and, due to such differences in the character string specifications, it is often that the image forming device does not perform operation as intended by the user.

SUMMARY OF THE INVENTION

According to one aspect of the invention, there is provided an improved image forming device and method in which the above-described problems are eliminated.

According to one aspect of the invention there is provided any of an image forming device, an image forming method, an image forming program, and a computer-readable recording medium which are adapted to absorb the differences in the character string specifications of the printer control protocol, and attain highly precise image formation.

In an embodiment of the invention which solves or reduces one or more of the above-mentioned problems, there is provided an image forming device which includes one or more trays and performs image formation on a printing medium in any of the trays according to an externally supplied printer control protocol, the image forming device comprising: a tray parameter table in which tray IDs for identifying the trays and tray parameters for the respective tray IDs are stored in a mutually associated manner; a selecting unit selecting a tray ID corresponding to a tray parameter which matches a tray designation parameter contained in the input printer control command, from among the tray IDs of the tray parameter table; an image forming unit performing image formation on a printing medium contained in a tray of the tray ID selected by the selecting unit; and a replacing unit receiving an input tray ID and an input tray change parameter specified by the externally supplied printer control protocol, and replacing a tray parameter contained in the tray parameter table and corresponding to a tray ID which is the same as the input tray ID, by the input tray change parameter.

In an embodiment of the invention which solves or reduces one or more of the above-mentioned problems, there is provided an image forming method for use in an image forming device which includes one or more trays, performs image formation on a printing medium in any of the trays according to an externally supplied printer control protocol, and includes a tray parameter table in which tray IDs for identifying the trays and tray parameters for the respective tray IDs are stored in a mutually associated manner, the image forming method comprising: receiving an input tray ID and an input tray change parameter specified by the externally supplied printer control protocol; and replacing a tray parameter contained in the tray parameter table and corresponding to a tray ID which is the same as the input tray ID, by the input tray change parameter.

In an embodiment of the invention which solves or reduces one or more of the above-mentioned problems, there is provided a computer-readable recording medium having program code stored thereon, which, when executed by a computer, causes the computer to perform an image forming method for use in an image forming device which includes one or more trays, performs image formation on a printing medium in any of the trays according to an externally supplied printer control protocol, and includes a tray parameter table in which tray IDs for identifying the trays and tray parameters for the respective tray IDs are stored in a mutually associated manner, the image forming method comprising: receiving an input tray ID and an input tray change parameter specified by the externally supplied printer control protocol; and replacing a tray parameter contained in the tray parameter table and corresponding to a tray ID which is the same as the input tray ID, by the input tray change parameter.

According to the embodiments of the image forming device and method of the invention, it is possible to attain highly precise image formation processing.

BRIEF DESCRIPTION OF THE DRAWINGS

Other objects, features and advantages of the present invention will be apparent from the following detailed description when reading in conjunction with the accompanying drawings.

FIG. 4A and FIG. 4B are diagrams showing examples of a tray parameter table.

FIG. 5 is a diagram showing an example of assignment of tray ID and tray parameter concerning each sheet-feeding tray of image forming devices shown in FIG. 1.

FIG. 6 is a diagram showing an example of the contents of the tray parameter assigned for an image forming device.

FIG. 7 is a diagram showing an example of assignment of a plurality of tray parameters.

FIG. 12 is a flowchart for explaining an example of the printing procedure using PS3.

DETAILED DESCRIPTION OF PREFERRED EMBODIMENTS

A description will be given of embodiments of the invention with reference to the accompanying drawings.

Figure 1:
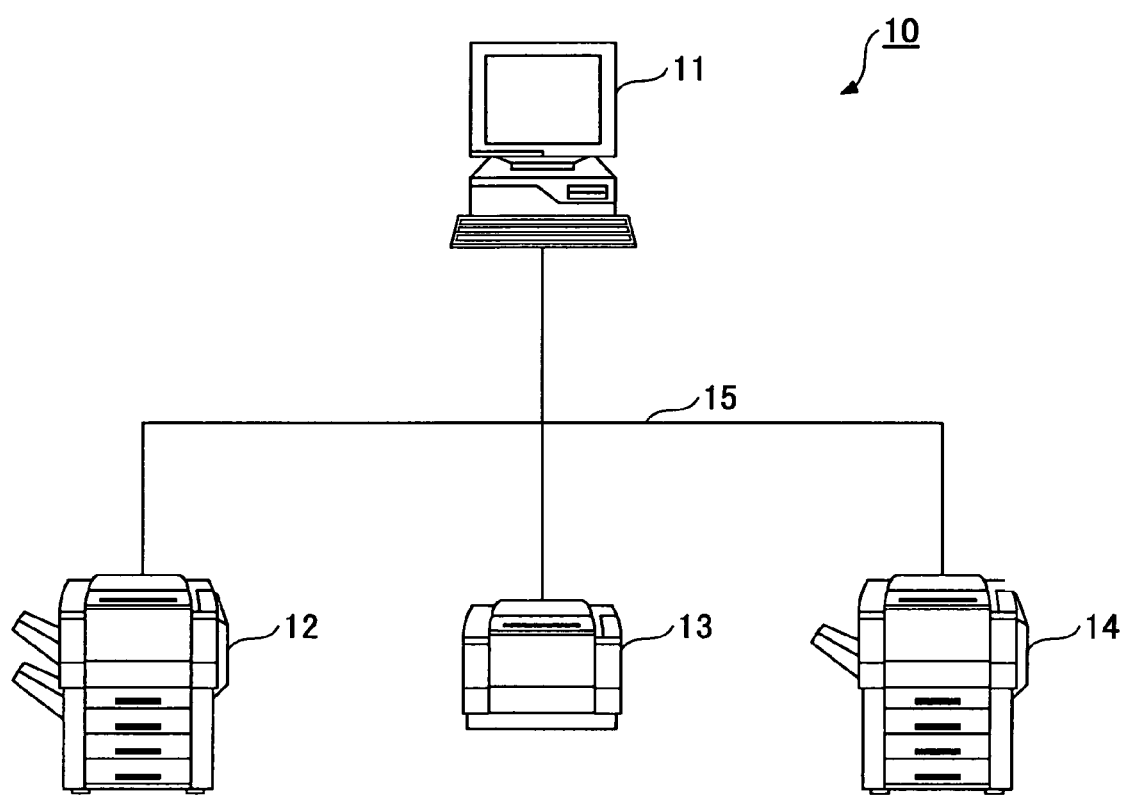
FIG. 1 is a diagram showing the whole composition of an image forming system.

FIG. 1 is a diagram showing the whole composition of an image forming system. As shown in FIG. 1, the mage forming system 10 is constituted so that it comprises an information processing device 11, such as a PC (personal computer) or a server, and a plurality of image forming devices 12-14, such as printers.

For example, the information processing device 11 and the respective image forming devices 12-14 are connected together through a communication network 15, such as LAN (local area network), so that data can be transmitted and received between the information processing device 11 and the respective image forming devices 12-14.

In this embodiment, it is supposed that each of the image forming devices 12-14 has a print function. Alternatively, they may have other image formation functions, such as a copying function, a facsimile function, a scanner function, etc.

In the image forming system of FIG. 1, the information processing device 11 creates the instruction which is described by the printer control command prepared by the driver, and transmits the created instruction to each of the image forming devices 12-14 which are connected via communication network 15.

It is assumed that each of the image forming devices 12-14 is provided with a protocol interpreter unit which interprets the printer control protocol, and provided with a printer emulation unit which interprets the printer control command. It is also assumed that each of the image forming devices 12-14 receives the instruction described by the printer control command from the information processing device 11, and performs image formation processing in accordance with the received instruction.

For the sake of convenience of description, it is supposed that the image forming device 12 is a printer of a model in which a standard specification is installed, and the image forming devices 13 and 14 are printers of a model in which a customized command specification is installed.

The composition of the image forming system 10 of this invention is not limited to the composition of FIG. 1. Alternatively, it may include a plurality of information processing devices. Also, the number of image forming devices included in the image forming system is not limited to the composition of FIG. 1. According to the invention, it is possible to absorb the difference in the character string specification of the printer control protocol and attain highly precise image formation in the system composition as shown in FIG. 1.

Next, an image forming device in an embodiment of the invention using the tray designation option which is one of the printer control protocols will be explained.

Figure 2:
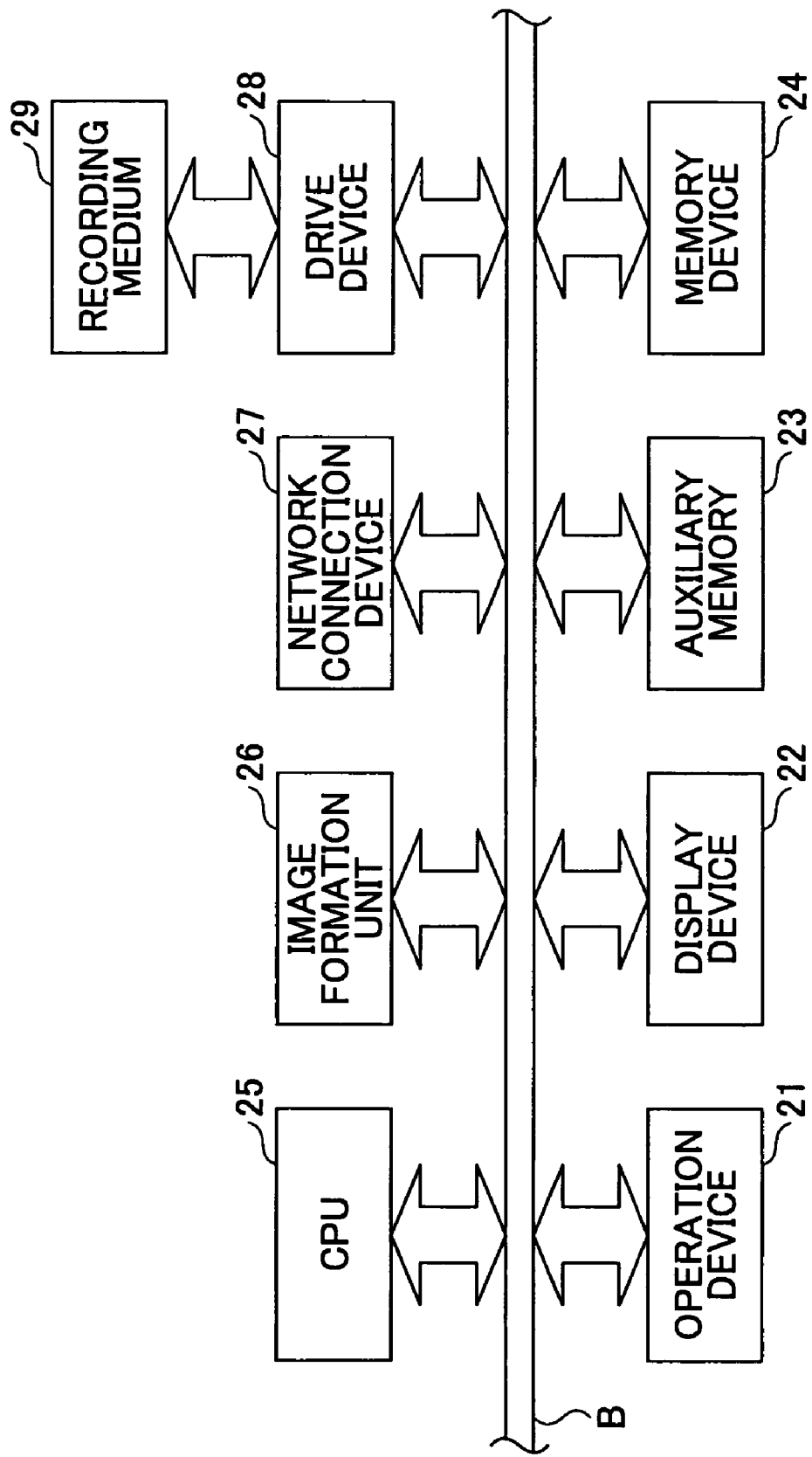
FIG. 2 is a block diagram showing the hardware composition of an image forming device in an embodiment of the invention.

FIG. 2 is a diagram showing the hardware composition of an image forming device in an embodiment of the invention.

As shown in FIG. 2, each of the image forming devices 12-14 comprises an operation device 21, a display device 22, an auxiliary memory 23, a memory device 24, and a CPU (central processing unit) 25 which performs various control processing, an image formation unit 26, a network connection device 27, and a drive device 28. And these elements of the image forming device are interconnected by a system bus B.

The operation device 21 inputs the information (data) operated by the user in order to cause the image forming device to perform image formation on a predetermined printing medium. The operation device 21 includes a touch panel, a key input section, etc. for inputting predetermined information.

The display device 22 displays the contents of change of a tray parameter operated by the operation device 21, the contents of the data inputted by the user, and the state of the image forming device at the time of print execution, in accordance with a control program of the CPU 25. The display device 22 includes a display monitor to which the displayed information is outputted. The above-mentioned touch panel may be configured to serve as both of the operation device 21 and the display device 22.

The auxiliary memory 23 is a storage device, such as a hard disk, and stores the contents of the image forming program of this invention, the control program which controls respective elements of the image forming devices 12-14, the tray parameter table, and the authentication user table etc. which will be described later. The output and input processing of the contents of the stored information may be performed with the auxiliary memory 23, if needed.

The memory device 24 stores the image forming program read from the auxiliary memory 23 by the CPU 25. The memory device 24 includes a ROM (read-only memory), a RAM (random access memory), etc.

The CPU 25 can control processing of the whole image forming device, such as various operations and I/O of the data with each hardware component, and can realize each processing in image formation etc., based on the control program and the image forming program which are stored in the memory device 24. The CPU 25 performs image formation processing in accordance with the image forming program stored in the memory device 24.

While a printing medium, such as paper, from the sheet-feeding tray is transported, the image formation unit 26 performs a predetermined image formation on the printing medium under the control of the CPU 25, based on the contents of instructions inputted by the user on the operation device 21 and the contents of instructions inputted by the information processing device 11 via the network connection device 27.

The network connection device 27 acquires various data from other terminals connected to the communication network 15 by communicating with the communication network 15, such as LAN. The network connection device 27 can use the image forming program of this invention by downloading the program from other terminals etc. and installing the same in the auxiliary memory 23 under the control of the CPU 25. The network connection device 27 can provide other terminals etc. with the image forming program of this invention or the results of image formation obtained.

The method of installing the program is not limited to the method of acquiring the same from the communication network 15. For example, the drive device 28 is provided in the image forming device and the program may be installed therein by means of the recording-medium 29, such as a memory card or CD-ROM. The recording medium 29 on which the program is recorded can be set in the drive device 28, and the image forming program contained in the recording medium 29 is installed in the auxiliary memory 23 via the drive device 28 from the recording medium 29.

The drive device 28 is adapted to record the program of this invention on the recording medium 29 under the control of the CPU 25. Thereby, using the recording medium 29, it is possible to install in a plurality of other computers easily, and it is possible to easily attain image formation processing which will be mentioned later.

Figure 3:
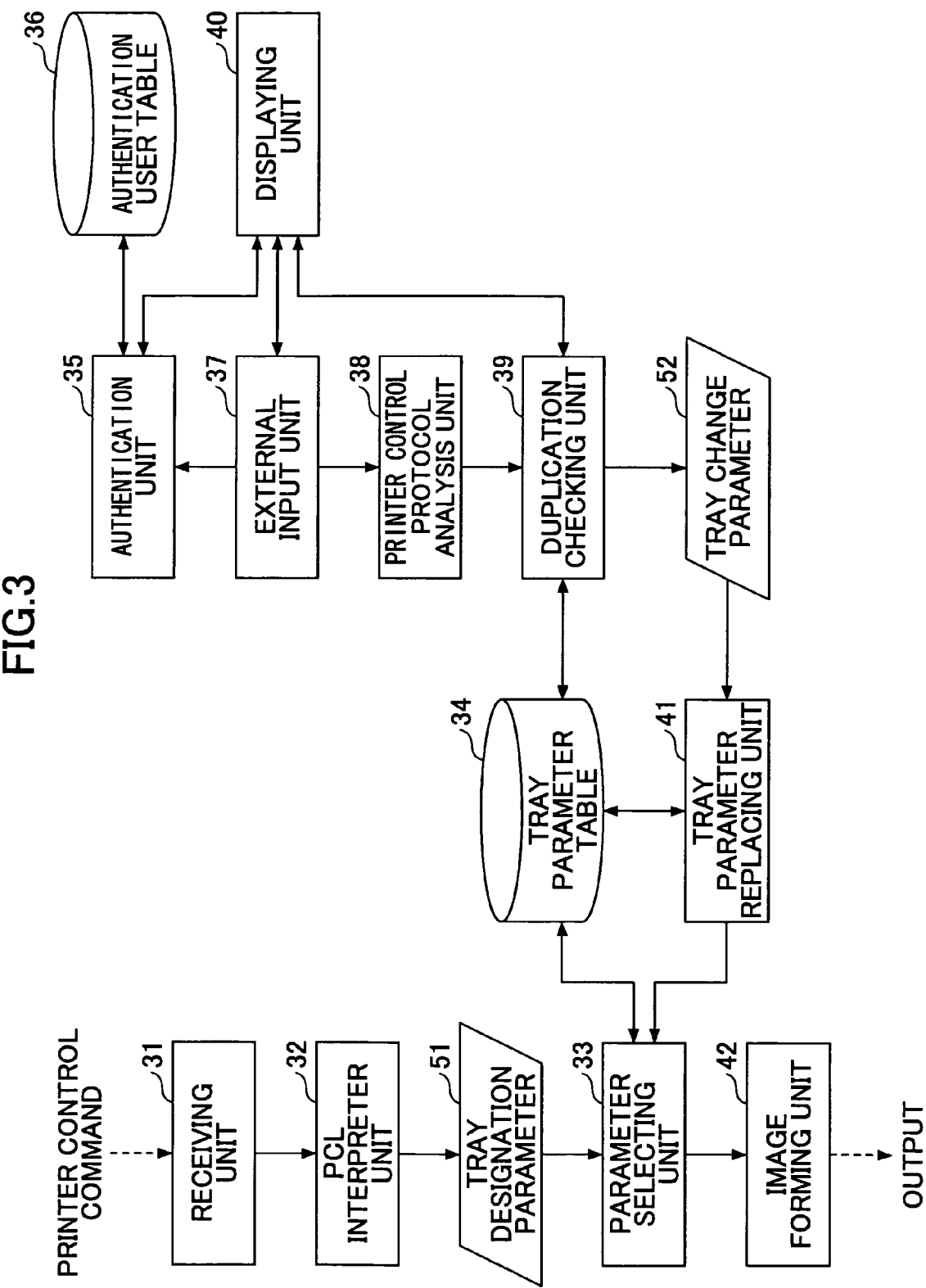
FIG. 3 is a block diagram showing the functional composition of an image forming device in an embodiment of the invention.

Next, the functional composition of each of the image forming devices 12-14 will be explained. FIG. 3 shows the functional composition of an image forming device in an embodiment of the invention.

As shown in FIG. 3, each of the image forming devices 12-14 comprises a receiving unit 31, a printer control language (PCL) interpreter unit 32, a parameter selecting unit 33, a tray parameter table 34, an authentication unit 35, an authentication user table 36, an external input unit 37, a printer control protocol analysis unit 38, a duplication checking unit 39, a displaying unit 40, a tray parameter replacing unit 41, and an image forming unit 42.

The receiving unit 31 receives the printer control command transmitted via the communication network 15 from the information processing device 11. The receiving unit 31 outputs the received printer control command to the printer control language interpreter unit 32.

The printer control language interpreter unit 32 converts the printer control command, inputted to each of the image forming devices 12-14, into the format that can be internally used in the image forming device. In this embodiment, the command (tray designation command) including tray designation is used as an example of the printer control command. For this reason, the printer control language interpreter unit 32 outputs the tray designation parameter 51 including the data format in which tray designation is possible.

When the printer control protocol is inputted by the receiving unit 31, the printer control language interpreter unit 32 analyzes the tray designation option specified according to the printer control protocol, and converts the same into a tray designation parameter 51.

The parameter selecting unit 33 selects tray ID specified by the tray designation parameter 51, based on the tray parameter table 34 in which association between tray parameter and tray ID is described and based on the tray designation parameter 51 produced by the printer control language interpreter unit 32.

The tray parameter table 34 is a data storing unit in which association between tray ID and tray parameter is stored. Tray ID is the identification information for identifying one or more trays provided in each of the image forming devices 12-14. The trays of each image forming device are identified by the tray IDs, respectively.

The authentication unit 35 inputs the authentication data of a user ID, a password, etc. which are entered by the user from the external input unit 37, and performs user authentication by making reference to the authentication user table 36 in which the authentication data is registered beforehand.

Displaying or changing of the contents of the tray parameter table 34 is permitted only to the user who is authenticated as having the administrator's authority as a result of the authentication. The authentication user table 36 is a data storing unit in which the authentication data of user IDs, passwords, etc. and the use condition (authority) of each user corresponding to the authentication data are stored.

The authentication unit 35 displays an authentication input screen on the displaying unit 40 or the monitor of the information processing device 11 connected to the image forming device via the communication network 15. Moreover, the authentication unit 35 is adapted to make an addition, a change, etc. of authentication data.

The external input unit 37 inputs the authentication data at the time of authentication performed by the authentication unit 35 mentioned above. Moreover, the external input unit 37 is adapted to input a printer control protocol. This makes it possible to input the tray ID and the tray change parameter, which will be mentioned later, by using the tray designation option obtained according to the printer control protocol.

The external input unit 37 is adapted to transmit or receive the contents of data inputted by the user from the displaying unit 40 or from an external device (such as the information processing device 11) connected to the image forming device via the communication network 15. This makes it possible to easily set up the image forming device by using the displaying unit 40. And, by enabling the access to the image forming device and the transmission and reception of data from the external device, it is possible to save the time and effort to perform the setup of image forming devices individually and directly, and it is possible to perform the setup of tray parameters by the central control.

The printer control protocol analysis unit 38 analyzes the tray designation option specified by the printer control protocol inputted from the external input unit 37, and converts it into a tray parameter.

The duplication checking unit 39 checks whether there is a duplication of assignment of a tray parameter produced by the printer control protocol analysis unit 38 for a plurality of tray IDs. This makes it possible to prevent the duplication of a certain tray parameter assigned to a plurality of tray IDs, and it is possible to prevent occurrence of an error, without making the interpretation of tray designation parameter depend on only one candidate.

The duplication checking unit 39 outputs the tray ID and the tray parameter after the duplication checking is completed to the tray parameter replacing unit 41 as the tray change parameter 52. When there is a duplication, the duplication checking unit 39 notifies it to the user by using the displaying unit 40 or the monitor of the information processing device 11. This makes it possible to send the notification of duplication to the user quickly, and it is possible to attain highly precise image formation.

The displaying unit 40 displays, on the display screen of the monitor, the contents of the authentication data inputted by the authentication unit 35, the contents of data inputted by the user using the external input unit 37, and the occurrence of a duplication error notified by the duplication checking unit 39, so that the user can grasp them easily. The displaying unit 40 may be constituted by a touch panel, so that the user is allowed to touch any of various setting elements displayed on the screen of the touch panel to perform selection of it.

Based on the tray change parameter 52, the tray parameter replacing unit 41 replaces the value of the tray parameter described by the same tray ID contained in the tray parameter table 34, by the value of the tray change parameter. The tray parameter replacing unit 41 outputs, to the parameter selecting unit 33, a control signal indicating that replacement processing is performed.

According to the above-mentioned processing, the parameter selecting unit 33 can acquire the corresponding tray parameter which is changed, by making reference to the changed tray parameter table 34 to select the tray ID. The parameter selecting unit 33 outputs the selected tray parameter to the image forming unit 42. The image forming device 41 transports a printing medium from the tray specified by the selected tray parameter, performs image formation on the printing medium, and outputs the printing medium on which the image formation is performed.

Next, the above-mentioned tray parameter table 34 will be explained. FIG. 4A and FIG. 4B show examples of the tray parameter table.

Each of the trays provided in the image forming devices 12-14 are respectively identified by a tray ID. FIG. 4A shows the tray parameter table in which the tray ID and the tray parameter have one-to-one correspondence. FIG. 4B shows the tray parameter table in which the tray ID and the tray parameter have one-to-many correspondence.

In the case shown in FIG. 4B, a plurality of tray parameters are set up to one tray ID, and a certain amount of versatility can be given with respect to the tray parameters according to another specification.

In the examples of FIG. 4A and FIG. 4B, the setting of tray parameter is possible for all of the tray IDs "automatic sheet selection", "Tray1"-"Tray9", "manual bypass" and "mass sheet feeding". The kind of ID which can be set up as a tray ID according to the invention is not limited to those in this embodiment. The value of tray parameter is not limited to a numerical value as in this embodiment. For example, a character notification may be used, and a combination of characters and numerical values may be used.

Next, an embodiment of the invention based on the functional composition of each of the image forming devices 12-14 mentioned above will be explained.

For example, in the case of PS3 (Post Script 3) which is one of the page description languages in the conventional technology, even if the command for tray designation does not exist in a file, the tray designation is performed as the option according to the "lpr protocol" (line printer daemon protocol). It is possible to specify the tray from which a printing medium, paper, should be transported.

Specifically, the tray designation, such as "lpr-P (printer name), filetype=RPS, tray=Tray2 (file name)" may be performed.

The portions "filetype=" and "tray=" mentioned above are the portions corresponding to the option mentioned above. The portion "tray=Tray2" is the printer control protocol which designates the tray. The printer control language interpreter unit 32 converts this tray designation into the parameter with which the page description language can be interpreted. A tray designation parameter is designated internally in the image forming device by the tray designation parameter obtained after the conversion.

FIG. 5 shows an example of assignment of tray ID and tray parameter concerning each sheet-feeding tray of the image forming devices 12-14 shown in FIG. 1.

In the example of FIG. 5, it is supposed that the printing system environment is constructed beforehand in the information processing device 11 and the image forming device 12 in which the standard specification is installed.

In this case, the user performs the tray designation as (tray=tray1) in accordance with the option specification of the printer control protocol, in order to select the Tray1 from the information processing device 11. In this case, the printer control language interpreter unit 32 of the image forming device 12 specifies "4" as a tray designation parameter corresponding to Tray1.

However, when the image forming device 13 is used in the same environment, there is a case in which the tray ID and the tray parameter corresponding to the tray ID may differ between the image forming device 12 and the image forming device 13, as shown in FIG. 5. For example, the tray designation parameter "4" of the image forming device 13 is assigned to "Tray3" in the example of FIG. 5. If "4" is specified as a tray designation parameter, "Tray1" which is the same as that of the image forming device 12 is not selected, but "Tray3" is selected.

Similarly, when the image forming device 14 is used, if "4" is specified as a tray designation parameter, "Tray2" is selected. For this reason, the conventional image forming device may perform printing operation from the wrong sheet-feeding tray which is not intended by the user, in this way.

To obviate the problem, in the image forming device of this invention, assignment of a tray parameter is changed by the above-mentioned tray parameter replacing unit 41.

FIG. 6 shows an example of the contents of the tray parameters assigned for the image forming device 13. As shown in FIG. 6, changing of the tray parameter assigned for the image forming device 13 is performed so as to be in conformity with that of the image forming device 12 in which the standard specification is installed. Thereby, the image forming device 13 can replace the customized specification by the standard specification easily and quickly.

If the specification of parameter assignment of the image forming device 13 is changed as shown in FIG. 6, the image forming device 13 is adapted to perform operation that is the same as the operation of the image forming device 12, and it is possible to carry out printing as intended by the user under the printing system environment containing the image forming device 12. For this reason, the above problem of the conventional image forming device in which the printing operation changes with the specifications thereof can be resolved.

The setup operation which must be performed by the user in the above-mentioned case is to input the tray ID designated for the image forming device 13, and the tray change parameter for changing the tray parameter corresponding to the designated tray ID, by using the external input unit 37 of FIG. 3. Thereby, the value of the corresponding tray parameter in the tray parameter table 34 can be replaced by the input operation.

In the above-mentioned embodiment, the example in which the tray parameter is replaced by the tray change parameter as shown in FIG. 6 has been described. However, as shown in FIG. 4B mentioned above, the problem may be avoided by setting up a plurality of tray parameters for a predetermined tray ID.

FIG. 7 shows an example of assignment of a plurality of tray parameters. In the example of FIG. 7, the tray parameters which are the same as those of the image forming device 12 having the standard specification are set up to the image forming device 13, together with the tray parameters according to the customized specification of the image forming device 13. That is, the values of tray change parameters are added to the values of the already stored tray parameters. For example, if the user (who originally uses the specification of the image forming device 13 and wishes to perform image formation processing using a printing medium of the tray "Tray1") specifies "8" as a tray designation parameter, the tray "Tray1" can be selected from among the plurality of tray parameters assigned. That is, the assignment of a plurality of tray parameters is allowed in this embodiment, and it can respond also to the existing command specifications of the image forming device 13 to some extent, while maintaining compatibility with the image forming device 12 having the standard specification.

In the case of the above-mentioned embodiment, when the value of a tray parameter in one specification is the same as that of a tray parameter assigned to another tray ID in other specifications, the set value may overlap.

For example, in the above example of FIG. 7, the tray parameter "4" is originally assigned to the tray (Tray3) of the image forming device 13, and this value is the same as the value of the tray parameter currently assigned to the tray (Tray1) of the image forming device 12.

Therefore, if the set value of image forming device 12 is simply added to the set value of the image forming device 13, duplication of tray parameter value occurs. To obviate the problem, it is necessary to avoid assigning the overlapping value of tray parameters as shown in the tray (Tray3) of the example of FIG. 7. Another method of avoiding the duplication of tray parameter value is to have a comparatively large number of digits for the value of a tray parameter beforehand, and set up a value for identifying the image forming device concerned to predetermined digits in the large number of digits.

Figure 8:
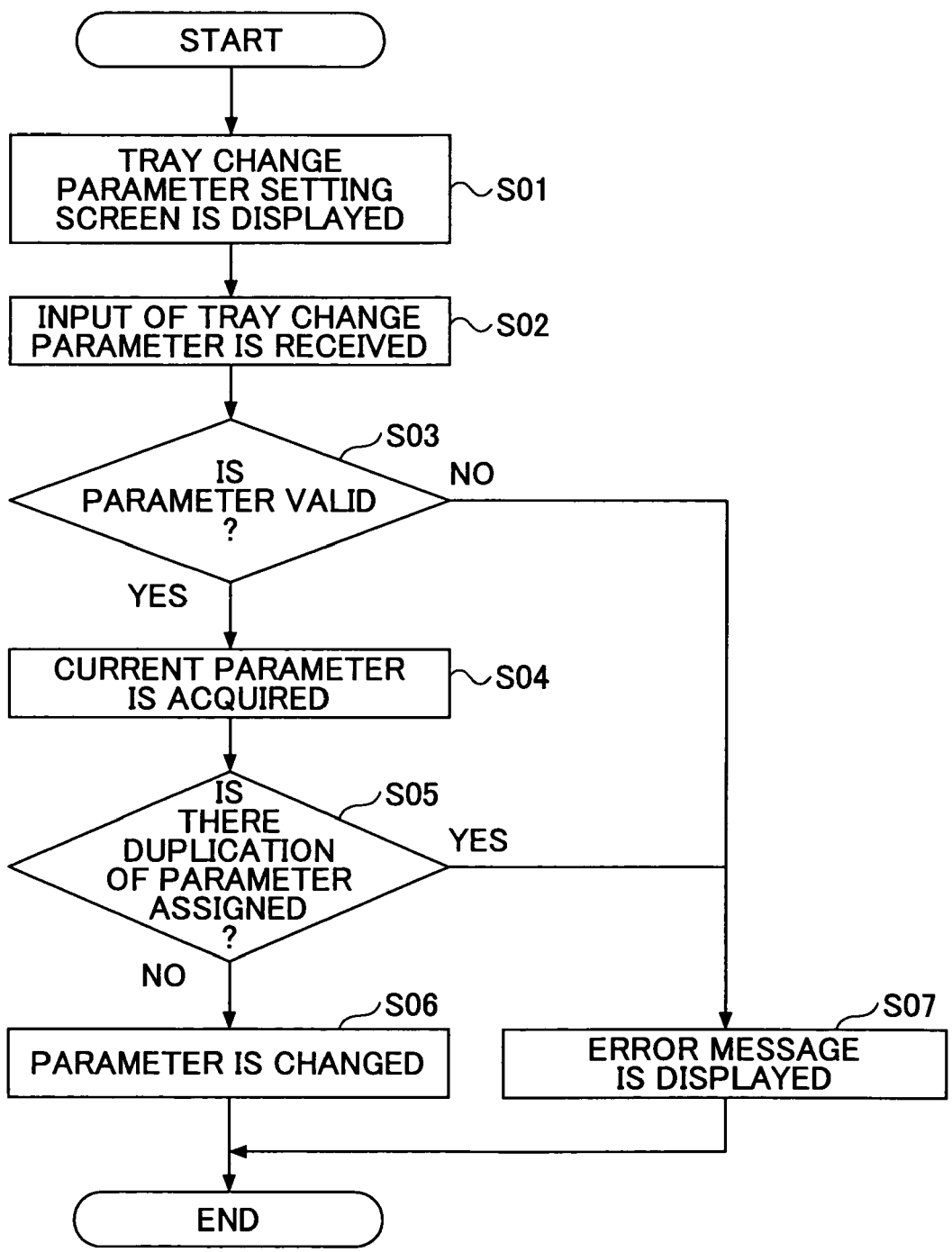
FIG. 8 is a flowchart for explaining an example of duplication check procedure.

However, it is preferred that the administrator can set up freely the tray parameters, and there is a possibility that a clerical error in setting of the tray parameters occurs. Thus, in order to prevent duplication more efficiently and with good accuracy, this embodiment is provided so that duplication of tray parameter value as mentioned above is checked in advance. Namely, in this embodiment, the checking of the duplication of a tray parameter is performed by using the duplication checking unit 39 shown in FIG. 3. When the tray parameter overlaps as a result of the checking, the user will be notified of a duplication error. Thus, it is possible to prevent the duplication of tray parameter value quickly and certainly The contents of the duplication check processing mentioned above will be explained with reference to FIG. 8. FIG. 8 is a flowchart for explaining an example of duplication check procedure.

Upon start of the duplication check processing of FIG. 8, the tray change parameter setting screen is displayed (S01).

Next, the input of a tray change parameter by the user is received (S02). And it is determined whether the input parameter is valid or not (S03). The checking of the validity of the input parameter is determined from the contents of characters or numbers in predetermined digits, or the range of numbers (for example, 0-99).

When the input parameter is valid, the current tray parameter is acquired from the tray parameter table 34 (S04).

Next, it is determined whether duplication of assignment of tray parameter value occurs or not (S05).

When no duplication occurs, a tray change parameter is created and the contents of the tray parameter table 34 are changed by using the tray parameter replacing unit 41 in order to change the tray parameter (S06).

When the input parameter is not valid in the step S03, or when the duplication of the parameter occurs in the step S05, the tray parameter is not changed, and the error message indicating the occurrence of a duplication error is displayed (S07). And the processing is ended.

The contents of the error message are to indicate that "the input parameter is not valid", "the input parameter overlaps", etc. Thereby, duplication of tray parameter value can be prevented quickly and certainly by notifying the user of a user's input mistake, a duplication error, etc.

The setting of a tray change parameter mentioned above may be carried out by the method using the displaying unit, such as the touch panel provided in the image forming devices 12-14, or by the remote method using the information processing device 11 connected with the image forming devices 12-14 via the communication network 15, such as Web, etc. For example, when the method of performing the setting on the Web is used, the remote control can be performed even from a distant location, and it is not necessary to perform the setting of a tray change parameter for the image forming devices individually.

Since specifying of an IP (Internet Protocol) address etc. on the information processing device 11 has the same effect as operating on the operation panel of the actual printer, it is convenient to the user who wishes to set up tray parameters to a plurality of image forming devices.

The time and effort in performing the setting of tray parameters separately and directly can be saved, and the setting of tray parameters can be performed by a centralized management. The necessity for installation of a special application program is also omitted by using the browser of the information processing device 11.

However, it is not desirable that anyone can change freely the tray parameter table which is the internal specifications of the image forming device while maintaining the ease of performing the setting of tray parameters.

To obviate the problem, the image forming device in this embodiment is provided with the authentication unit 35 and the authentication user table 36 as shown in FIG. 3, and the checking of user authentication is performed.

The authentication unit 35 displays the authentication screen on the displaying unit 40 for causing the user to input the authentication data of a user ID, a password, etc.

When the authentication data inputted by the user is an authentication result which has predetermined authority, such as manager authority, an indication is given and change of the information stored in tray parameter table 34 etc. is enabled.

Thereby, it is possible to prevent changing of the assignment of tray parameters easily.

Figure 9:
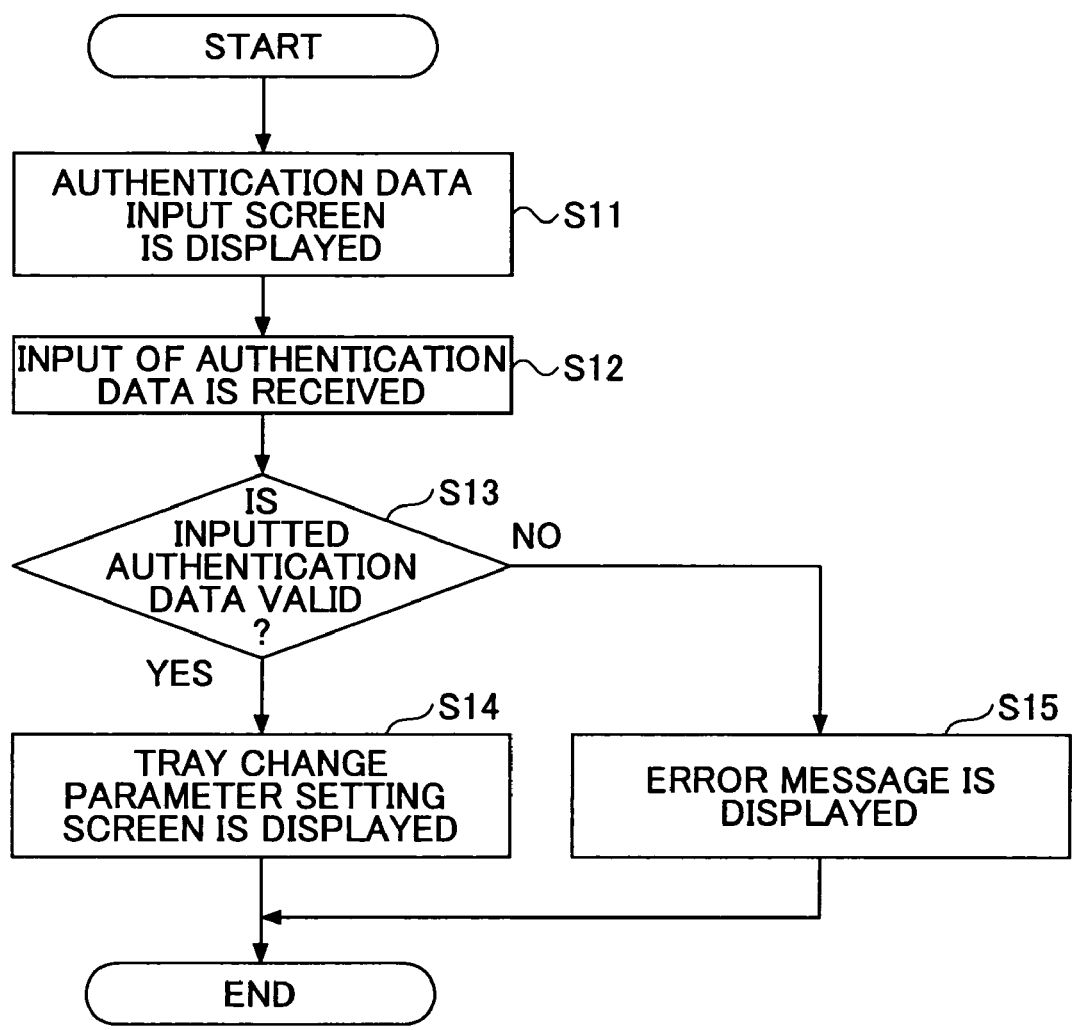
FIG. 9 is a flowchart for explaining an example of an authenticating processing procedure.

An example of the authenticating processing procedure will be explained with reference to FIG. 9. FIG. 9 is a flowchart for explaining an example of the authenticating processing procedure.

Upon start of the authenticating processing of FIG. 9, the authentication data input screen for causing the user to input authentication data is displayed (S11).

Next, the input of authentication data by the user is received (S12). And it is determined whether the authentication data is valid (S13). The checking of the validity of the inputted authentication data is determined by comparing it with the stored authentication data in the authentication user table 36 mentioned above.

When the authentication data is valid, the tray change parameter setting screen is displayed based on the certification authority set up for the authentication data (S14).

When the inputted authentication data is not valid as a result of authentication in the step S13, the error message indicating the occurrence of an error is displayed (S15), and the processing is ended.

For example, the error message may indicate "the authentication data is not registered" or "the inputted authentication data (a user ID, a password, etc.) does not allow the setting of the tray change parameter". Thereby, the user can grasp the occurrence of the error quickly.

Thus, according to this embodiment, checking of the user's authority for changing the tray parameters is first performed by using the authentication user table 36, and thereafter the above-mentioned tray parameter changing processing is performed.

An example of the display screen (user interface) which allows the user to perform the input of authentication data and the setting of tray parameters by using the external input unit 37 will be explained.

Figure 10A:
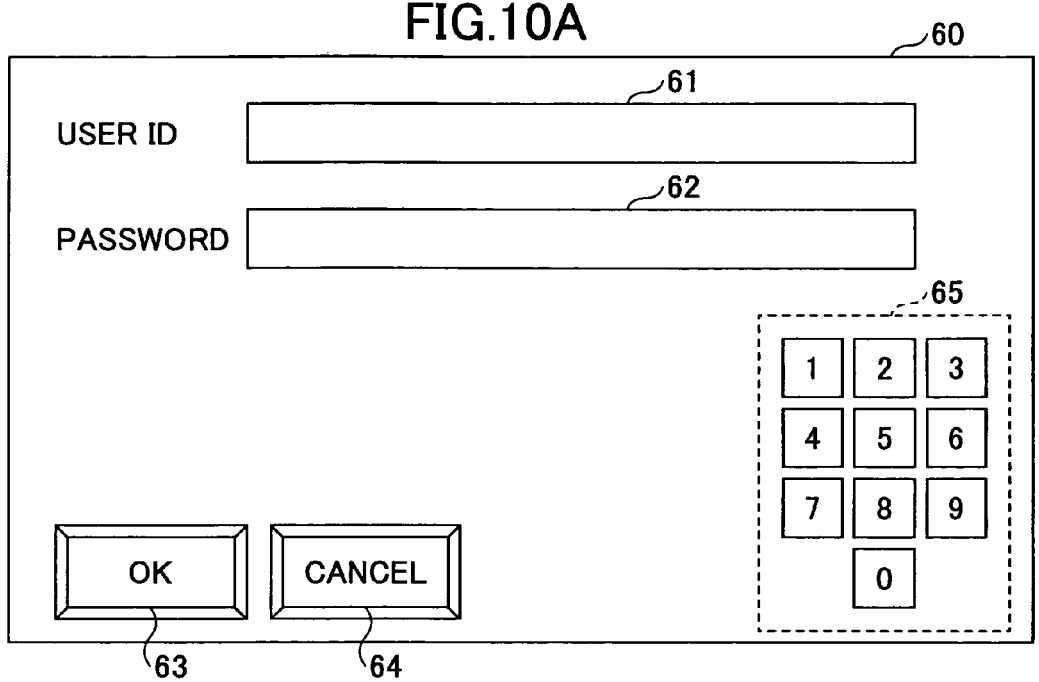
FIG. 10A is a diagram showing an example of an input screen.
Figure 10B:
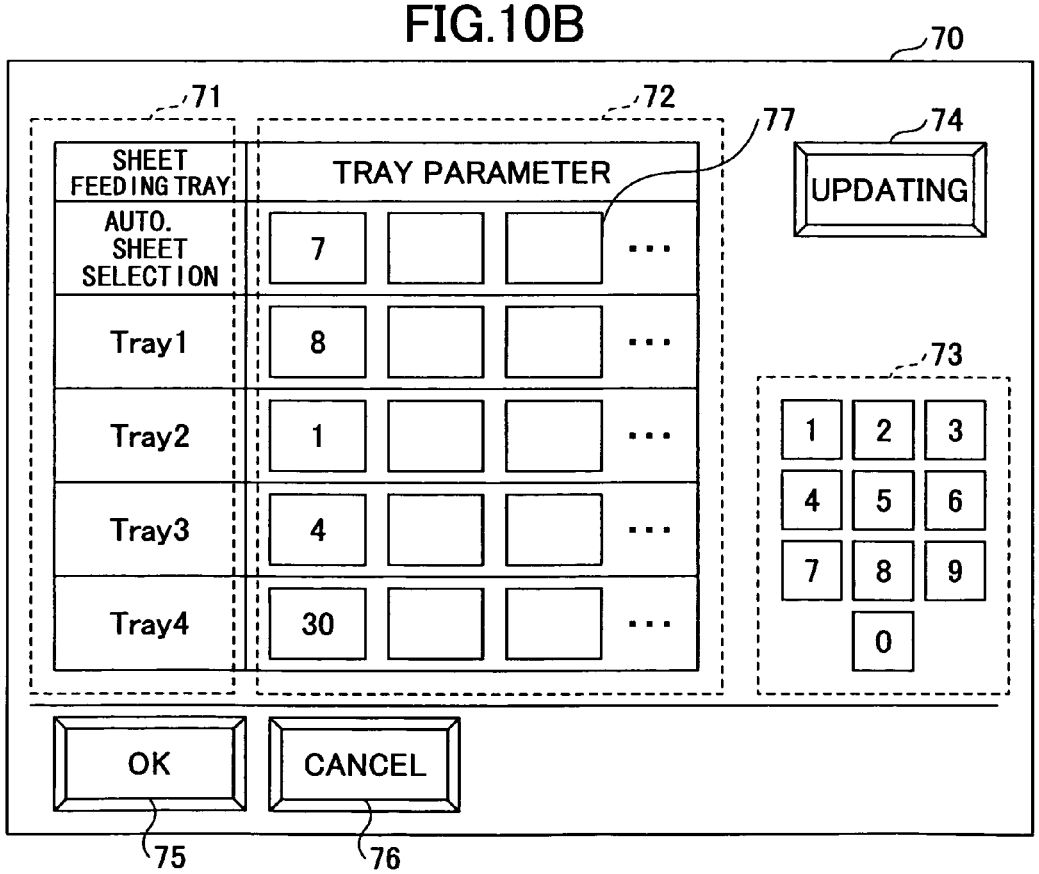
FIG. 10B is a diagram showing an example of a setting screen.

FIG. 10A and FIG. 10B show examples of an input screen and a setting screen.

In the examples of FIG. 10A and FIG. 10B, when performing operation to the image forming devices 12-14 directly, the UI screen which is displayed on the touch panel as the displaying unit 40 is illustrated.

FIG. 10A shows an example of the authentication data input screen. FIG. 10B shows an example of the setting screen of a tray change parameter.

The authentication data input screen 60 of FIG. 10A is constituted so that it contains a user ID input area 61 for inputting the user ID as authentication data, a password input area 62 which enters a password, an OK button 63, a cancel button 64, and a key display area 65. However, the layout of the screen is not limited to the example of FIG. 10A.

When inputting authentication data, the user ID input area 61 is first touched to input a user ID, and then the corresponding numerical value is entered by choosing predetermined buttons from the group of buttons displayed on the key display area 65 including numbers (or characters).

When entering a password, the password input area 63 is first touched and the password is entered by choosing predetermined buttons from the group of buttons of the key display area 65.

The authentication processing is started by choosing the OK button 63 after the above input operation is completed. When the result of authentication is affirmative, the tray change parameter setting screen shown in FIG. 10B will be displayed. On the other hand, when the result of authentication is an error, an error message will be displayed.

The tray parameter setting screen 70 of FIG. 10B is constituted so that it contains a tray indicating area 71, a display input area 72 of the tray parameter corresponding to the tray, a key display area 73 for inputting a character and a number, an updating button 74, an OK button 75, and a cancel button 76. However, the layout of this screen is not limited to the example of FIG. 10B.

The sheet-feeding trays displayed on the tray indicating area 71 are a list of the trays which are actually provided in the image forming device.

The tray parameter display input area 72 includes one or more boxes 77 so that a plurality of tray parameters can be assigned for each of the trays displayed on the tray indicating area 71.

The user can select the box 77 by touching the corresponding screen location, and can set up a tray parameter by inputting the tray parameter using the key display area 73.

The setting of the tray parameter can be performed by touching the updating button 74 or OK button 75 after the input of the tray parameter.

When performing the duplication checking in the example of the screen of FIG. 10B, a tray change parameter to be assigned for each tray ID is inputted, and the updating button 74 or OK button 75 is selected (or touched).

After the updating button 74 or OK button 75 is selected, it is determined whether the inputted tray change parameter is in the suitable range.

When the inputted tray change parameter is not in the suitable range, the parameter is invalid and an error message is displayed.

When the inputted tray change parameter is valid, the set value of the current tray parameter is acquired and it is determined whether duplication of the tray parameter occurs.

When the duplication of the tray parameter occurs, the input value is invalid and an error message will be displayed.

When the duplication of the tray parameter does not occurs, replacing or addition of the tray change parameter is carried out to the corresponding value in the tray parameter table.

Thus, the user's input screen is displayed in this manner, and the input and setup of the tray parameters by the user can be carried out quickly and certainly.

Since the tray change parameter inputted from the outside can be assigned to an arbitrary tray ID in the tray parameter table, the interpretation of the tray designation parameter contained in the printer control command or the printer control protocol can be changed easily.

Therefore, the difference in the character string specification between printer control protocols can be absorbed, and image formation processing can be carried out with good accuracy.

The above-mentioned input screen is a UI screen which is displayed on the displaying unit 40. When the information processing device 11 connected to the image forming device via the communication network 15 is operated, the UI screen is displayed on the display monitor of the information processing device.

The input of data may be performed using the group of buttons provided in the image forming devices 12-14, or the keyboard provided in the information processing device 11, instead of the key display areas 65 and 73 shown in FIG. 10A and FIG. 10B. In that case, the displaying of the key display areas 65 and 73 can be omitted.

An example of the printing procedure in this embodiment will be explained with reference to FIG. 11. In the following example of the printing procedure, the case in which PCL (Printer Control Language) is used, and the case in which PS3 (Post Script 3) is used will be explained.

Figure 11:
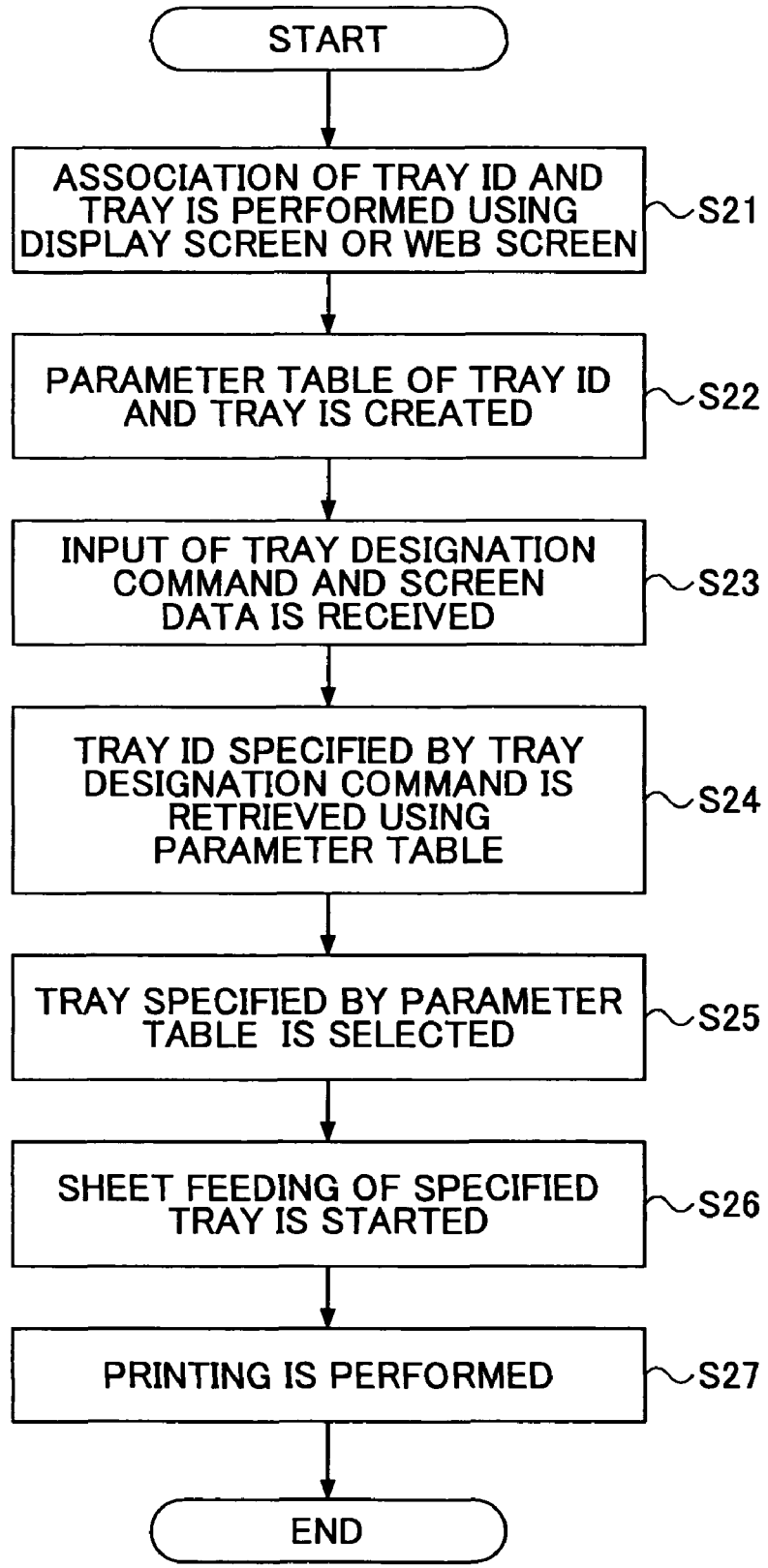
FIG. 11 is a flowchart for explaining an example of the printing procedure using PCL.

FIG. 11 is a flowchart for explaining an example of the printing procedure using PCL.

As shown in FIG. 11, association of tray ID and tray is performed as one of the panel setting items of the display screen of the image forming device, or association of tray ID and tray in the image forming device is performed by using a Web screen of the information processing device side (S21). It is supposed that changing an association of tray ID and tray freely is permitted. A parameter table which is the base of the association between tray ID and tray is created internally (S22).

Next, the image forming device receives the input of a tray designation command containing the tray designation command described by the PCL command, and image data in the PCL format (S23).

The image forming device retrieves the tray ID specified by the inputted tray designation command by making reference to the parameter table (S24). Next, the image forming device selects the tray specified for the tray ID using the parameter table (S25). And the bit-mapped video data is sent to the image forming unit which is the engine part of the image forming device, and the sheet feeding of the specified tray is started (S26). And printing is performed so that an image is formed on the sheet in accordance with the video data (S27).

FIG. 12 is a flowchart for explaining an example of a printing procedure using PS3.

As shown in FIG. 12, association of tray ID and tray is performed as one of the panel setting items of the display screen in the image forming device, or association of tray ID and tray in the image forming device is performed using the Web screen of the information processing device (S31). It is supposed that changing the association of tray ID and tray freely is permitted. A parameter table which is the base of the association of tray ID and tray is created internally (S32).

Next, the image forming device receives the input of a printer control protocol in which the printing attribute (tray designation etc.) is specified as the option, from an external device, such as the information processing device (S33).

And the image forming device opens the session of the printer control program with the tray designation (S34).

As mentioned above, in the case of PCL, the PCL command is used, but there is no command in the case of PS3. For this reason, the option specification of lpr may be used instead.

Therefore, only the image data without the tray designation at the data portion subsequent to the specified option of lpr can be inputted (S35) and the versatility of data can be increased. That is, the tray control of the general-purpose data (file) which does not contain a tray designation command can be carried out by using PS3.

Next, the contents of the tray designation in the printer control protocol are analyzed (S36). And the specified tray ID is retrieved by making reference to the parameter table (S37). The tray specified for the tray ID in the parameter table is selected (S38). And the video data which is the bit-mapped image data is sent to the image forming unit which is the engine part of the image forming device, and the sheet feeding of the specified tray is started (S39). And printing is performed so that an image is formed on the sheet in accordance with the video data (S40).

The option specification of lpr is used in the above case of PS3. However, the invention is not limited to this embodiment. For example, other control protocols, such as the rcp (remote copy) command, may be used instead.

Apart from the image forming device in the above embodiment, it is possible to provide a computer-readable program which, when executed by a computer, causes the computer to perform the above-described image formation processing in the above embodiment. In that case, the computer-readable program may be installed in the control part (controller) of the image forming device, so that the above-described image formation processing can be carried out.

Therefore, since the tray change parameter obtained by the externally supplied printer control protocol can be assigned to arbitrary tray IDs in the tray parameter table, the interpretation of the tray designation parameter can be changed easily.

It is also possible to provide a computer-readable recording medium having the above-mentioned image forming program recorded thereon. By using the recording medium, the image forming program can be easily installed in two or more of other computers.

Since the tray change parameter obtained by the printer control protocol by which an external input is carried out can be assigned to arbitrary tray IDs in a tray parameter table according to this invention as mentioned above, the interpretation of a tray designation parameter can be changed easily.

Therefore, the difference in the character string specification of the printer control protocol can be absorbed, and the image formation processing can be carried out with good accuracy.

In the example mentioned above, a tray designation command is used as an example of a printer control command. However, in other control commands (for example, delivery bottle (tray) designation command etc.), the same processing may be performed similarly.

The present invention is not limited to the above-described embodiments, and variations and modifications may be made without departing from the scope of the present invention.

Further, the present application is based on and claims the benefit of priority of Japanese patent application No. 2005-350752, filed on Dec. 5, 2005, the entire contents of which are hereby incorporated by reference.

What is claimed is:

1. An image forming device which includes one or more trays and performs image formation on a printing medium in any of the trays according to an externally supplied printer control protocol, comprising:
    a tray parameter table in which tray IDs for identifying the trays and tray parameters for the respective tray IDs are stored in a mutually associated manner;
    a selecting unit selecting a tray ID corresponding to a tray parameter which matches a tray designation parameter contained in the input printer control command, from among the tray IDs of the tray parameter table;
    an image forming unit performing image formation on a printing medium contained in a tray of the tray ID selected by the selecting unit;
    a replacing unit receiving an input tray ID and an input tray change parameter specified by the externally supplied printer control protocol, and replacing a tray parameter contained in the tray parameter table and corresponding to a tray ID which is the same as the input tray ID, by the input tray change parameter; and
    a duplication checking unit checking whether there is a duplication of assignment of a tray parameter for a plurality of tray IDs.

2. The image forming device according to claim 1, further comprising a printer control protocol analysis unit analyzing a tray designation option specified by the printer control protocol, and converting the tray designation option into a tray parameter.

3. The image forming device according to claim 1, wherein the tray parameter table is configured to store a plurality of tray parameters corresponding to a tray ID in a mutually associated manner, and the replacing unit is configured to add a tray change parameter to the plurality of tray parameters.

4. The image forming device according to claim 1, further comprising an external input unit allowing a user to input a tray change parameter to the image forming device.

5. The image forming device according to claim 4, wherein the external input unit is configured to transmit or receive data inputted by the user from a displaying unit or from an external device connected to the image forming device via a communication network.

6. The image forming device according to claim 4, further comprising an authentication unit performing user authentication with respect to authentication data inputted by the user from the external input unit, the authentication unit being configured to permit displaying or changing of contents of the tray parameter table only to a user who is authenticated as a result of the user authentication.

7. An image forming method for use in an image forming device which includes one or more trays, performs image formation on a printing medium in any of the trays according to an externally supplied printer control protocol, and includes a tray parameter table in which tray IDs for identifying the trays and tray parameters for the respective tray IDs are stored in a mutually associated manner, the image forming method comprising:
    receiving an input tray ID and an input tray change parameter specified by the externally supplied printer control protocol;

replacing a tray parameter contained in the tray parameter table and corresponding to a tray ID which is the same as the input tray ID, by the input tray change parameter; and checking whether there is a duplication of assignment of a tray parameter for a plurality of tray IDs.

8. The image forming method according to claim 7, further comprising:

analyzing a tray designation option specified by the printer control protocol; and converting the tray designation option into a tray parameter.

9. The image forming method according to claim 7, wherein the tray parameter table is configured to store a plurality of tray parameters corresponding to a tray ID in a mutually associated manner, and said replacing is configured to add a tray change parameter to the plurality of tray parameters.

10. The image forming method according to claim 7, wherein the image forming device includes an external input unit allowing a user to input a tray change parameter to the image forming device, and the external input unit is configured to transmit or receive data inputted by the user from a displaying unit or from an external device connected to the image forming device via a communication network.

11. The image forming method according to claim 10, further comprising performing user authentication with respect to authentication data inputted by the user from the external input unit, the user authentication being configured to permit displaying or changing of contents of the tray parameter table only to a user who is authenticated as a result of the user authentication.

12. A computer-readable recording medium having program code stored thereon, which, when executed by a computer, causes the computer to perform an image forming method for use in an image forming device which includes one or more trays, performs image formation on a printing medium in any of the trays according to an externally supplied printer control protocol, and includes a tray parameter table in which tray IDs for identifying the trays and tray parameters for the respective tray IDs are stored in a mutually associated manner, the image forming method comprising:

receiving an input tray ID and an input tray change parameter specified by the externally supplied printer control protocol;

replacing a tray parameter contained in the tray parameter table and corresponding to a tray ID which is the same as the input tray ID, by the input tray change parameter; and checking whether there is a duplication of assignment of a tray parameter for a plurality of tray IDs.

* * * * *